United States Patent
An et al.

(10) Patent No.: US 9,920,782 B2
(45) Date of Patent: Mar. 20, 2018

(54) ARMREST LOCK

(71) Applicants: Hyundai Motor Company, Seoul (KR); NIFCO KOREA Inc., Asan-si (KR); Dongkook Ind. Co., Ltd, Asan-si (KR)

(72) Inventors: Jae Hyun An, Seosan-Si (KR); Tae Su Jang, Cheonan-si (KR); In Chan Jeong, Ulsan (KR)

(73) Assignees: Hyundai Motor Company, Seoul (KR); NIFCO KOREA Inc., Asan-si (KR); Dongkook Inc. Co., Ltd, Asan-si (KR)

(*) Notice: Subject to any disclaimer, the term of this patent is extended or adjusted under 35 U.S.C. 154(b) by 371 days.

(21) Appl. No.: 14/526,165

(22) Filed: Oct. 28, 2014

(65) Prior Publication Data
US 2016/0003275 A1    Jan. 7, 2016

(30) Foreign Application Priority Data

Jul. 2, 2014 (KR) .................. 10-2014-0082437

(51) Int. Cl.
*B60N 2/00* (2006.01)
*B60N 2/46* (2006.01)
*F16B 7/04* (2006.01)

(52) U.S. Cl.
CPC .......... *F16B 7/0473* (2013.01); *B60N 2/4606* (2013.01); *B60N 2/466* (2013.01); *B60N 2/4646* (2013.01); *B60N 2/4686* (2013.01); *Y10T 403/599* (2015.01)

(58) Field of Classification Search
CPC .... B60N 2/4606; B60N 2/4646; B60N 2/466; B60N 2/4686; B60N 2/4626; E05B 83/32; F16B 7/0473; B60R 2011/0014; Y10T 292/11
USPC ....... 292/200, 226, 227, 194, 195, 219, 220, 292/228
See application file for complete search history.

(56) References Cited

U.S. PATENT DOCUMENTS 6,007,155 A * 12/1999 Hara ...................... B60N 3/083
                                                      248/118.5
6,616,206 B2 * 9/2003 Luginbill ............. B60N 2/4646
                                                      224/539
6,719,367 B2 * 4/2004 Mic ...................... B60N 2/4646
                                                      296/37.8

(Continued)

FOREIGN PATENT DOCUMENTS

DE    102007013081 A1 * 9/2008 .......... B60N 2/4646
EP         0587014 A2 * 3/1994 ............ B60N 2/468

(Continued)

*Primary Examiner* — Josh Skroupa
*Assistant Examiner* — Matthew R McMahon
(74) *Attorney, Agent, or Firm* — Morgan, Lewis & Bockius LLP

(57) ABSTRACT

An armrest lock may include a lever coupled to one side of the sliding cover, a rod provided in the sliding cover such that one side thereof is coupled to the lever, a trigger coupled to the other side of the rod and configured to operate in response to a motion of the lever, and a locking element coupled to the opening door and the armrest body and configured to be unlocked from at least one of the opening door and the armrest body when coming into contact with the trigger.

5 Claims, 4 Drawing Sheets

(56) References Cited

U.S. PATENT DOCUMENTS

| | | | | |
|---|---|---|---|---|
| 6,932,402 B2 * | 8/2005 | Niwa | ................... | B60N 2/4646 296/1.09 |
| 7,029,049 B2 * | 4/2006 | Rockafellow | ........ | B60N 2/4626 296/1.09 |
| 7,114,772 B2 * | 10/2006 | Kobayashi | ............. | B60N 3/103 297/188.04 |
| 7,296,839 B2 * | 11/2007 | Scheerhorn | .......... | B60N 2/4606 296/24.34 |
| 9,156,386 B2 * | 10/2015 | Cinco | .................. | B60N 2/4646 |
| 9,211,844 B2 * | 12/2015 | Washio | ................ | B60N 2/4646 |
| 2010/0156129 A1 * | 6/2010 | Evans | ....................... | B60R 7/04 296/24.34 |
| 2011/0227359 A1 | 9/2011 | Fesenmyer | | |

FOREIGN PATENT DOCUMENTS

| | | |
|---|---|---|
| KR | 10-2005-0058574 | 6/2005 |
| KR | 10-2005-0120112 | 12/2005 |
| KR | 10-2012-0011631 | 2/2012 |
| KR | 10-1500271 B1 | 3/2015 |

* cited by examiner

ARMREST LOCK

CROSS REFERENCE TO RELATED APPLICATION

The present application claims priority to Korean Patent Application No. 10-2014-0082437 filed Jul. 2, 2014, the entire contents of which is incorporated herein for all purposes by this reference.

BACKGROUND OF THE INVENTION

1. Field of the Invention

The present invention relates, in general, to an armrest lock for locking an armrest and, more particularly, to a lock for slidable armrests which can unlock a door for a storage space within the armrest, regardless of the nature of the sliding action of the slidable armrest.

2. Description of Related Art

Generally, a vehicle is provided with a console box between a driver's seat and a passenger's seat in order to store a relatively small object therein. The console box is provided within an armrest on which an occupant rests his/her arm while serving as a cover for the console box.

That is, the armrest serves to reduce the fatigue of the occupant occurring due to an extended travel time, allowing the occupant to rests his/her arm on the armrest, thereby preventing injury due to fatigue.

There has recently been created an advanced armrest, which can slide forwards and backwards to suit the occupant's body size. Thus, the occupant can easily adjust the longitudinal position of the armrest to suit his/her body size.

However, a conventional slidable armrest has a problem in that, since a lock to keep the console box closed and a lever to unlock the lock is fixed in its position regardless of the sliding action of the armrest, when the armrest slides forwards, the occupant cannot actuate the lever so that the console box cannot be opened.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an armrest lock which allows an occupant to actuate a lever to open a console box contained therewithin even when the armrest has been slid forwards.

According to various aspects of the present invention, an armrest lock, in which an armrest has an armrest body, an opening door provided on the armrest body, and a sliding cover slidably provided on the opening door, may include a lever coupled to one side of the sliding cover; a rod provided in the sliding cover in which one side of the rod is coupled to the lever, a trigger coupled to another side of the rod and configured to operate in response to a motion of the lever, and a locking element coupled to the opening door and the armrest body and configured to be unlocked from at least one of the opening door and the armrest body when coming into contact with the trigger.

One side of the locking element may be rotatably coupled to the opening door and another side of the locking element may be engaged with the armrest body.

The locking element may be formed into a pair of branched parts at the one side of the locking element.

One side of the trigger may be coupled to the rod and another side may be bent towards the locking element.

The rod may pass between the pair of branched parts of the locking element.

The opening door may be provided, on an upper portion thereof, with a pair of rod rails along the direction of movement of the rod, and the other side of the rod may be provided with a pair of rod-side projections to be coupled with the pair of rod rails.

The locking element may be provided, on one side thereof, with a protrusion.

One side of the lever may be rotatably coupled to the sliding cover, and may be provided with an extension to be brought into contact with the protrusion of the locking element when the lever rotates.

According to the armrest lock having the above-mentioned construction, regardless of whether the armrest cover did or did not slide forwards, the occupant can activate the lever to open the receptacle in the armrest body, thereby increasing the occupant's convenience.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
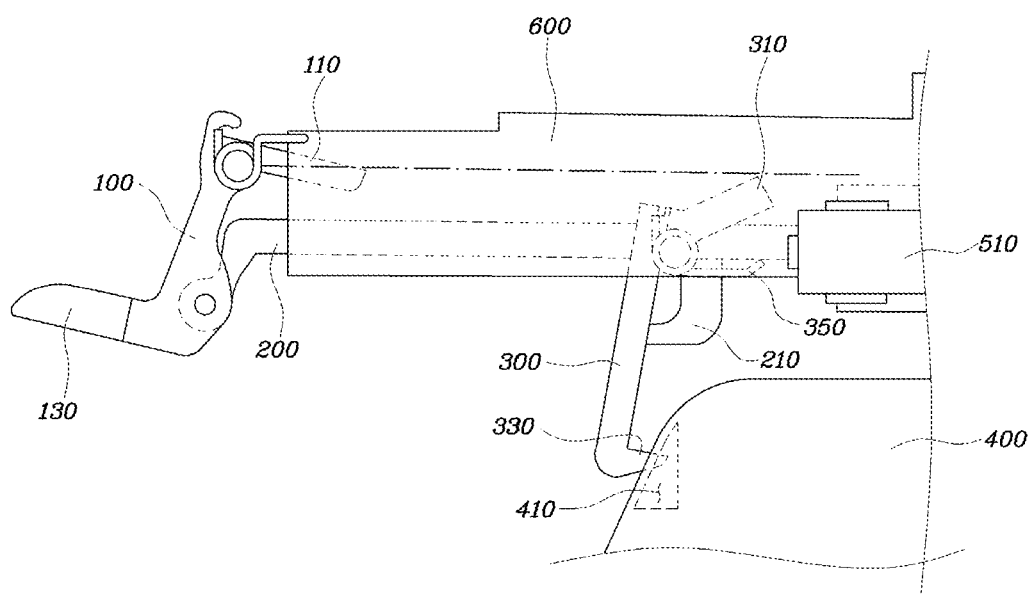
FIG. 1, FIG. 2 and FIG. 3 are views showing the construction of an exemplary armrest lock according to the present invention.
Figure 2:
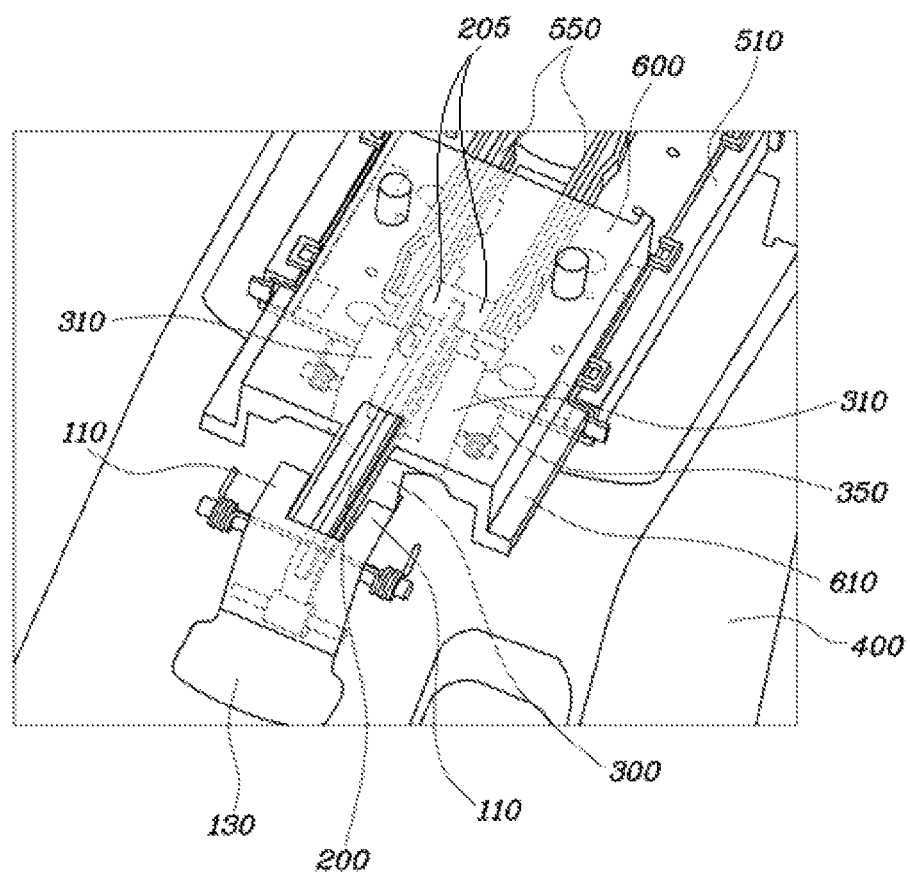
Figure 3:
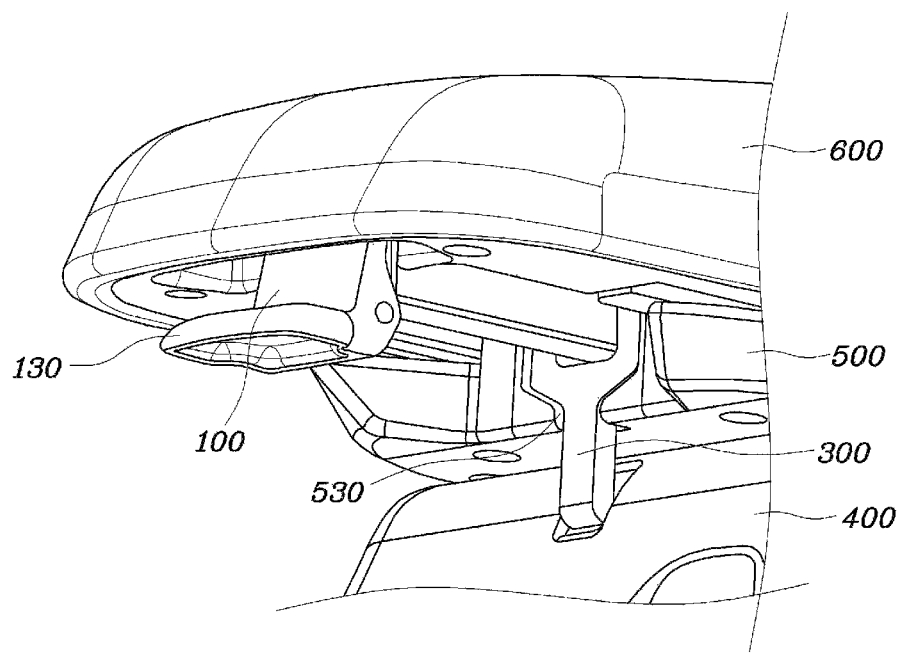
Figure 4:
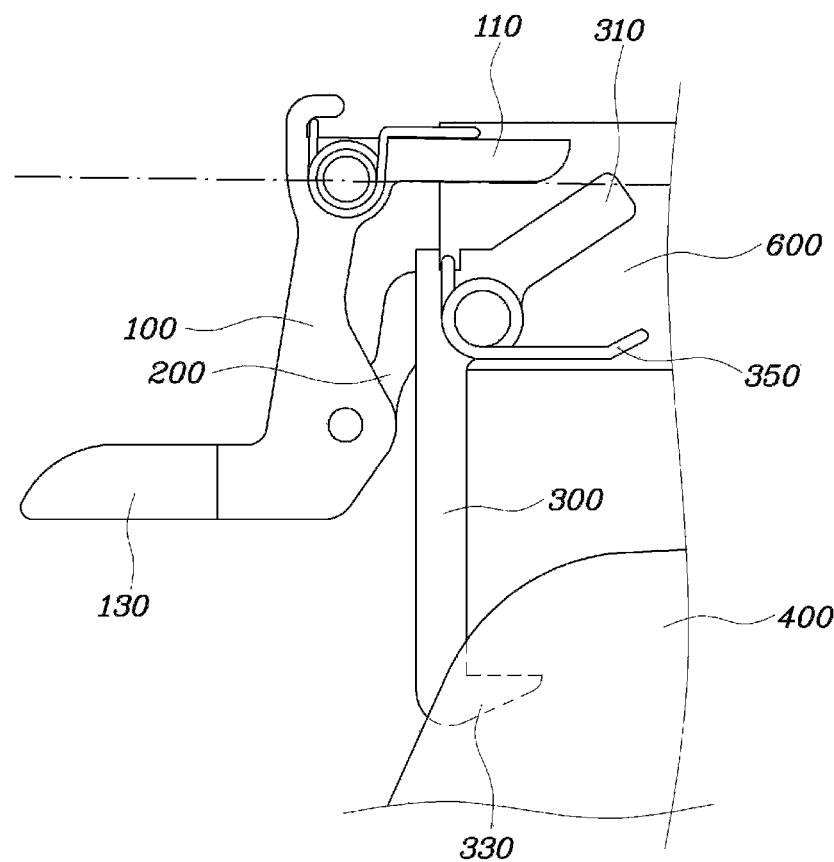
FIG. 4 is a view showing a lever and a locking element in the exemplary armrest lock according to the present invention.

FIG. 1, FIG. 2 and FIG. 3 are views showing the construction of an armrest lock according to various embodiments of the present invention, and FIG. 4 is a view showing a lever and a locking element according to various embodiments of the present invention.

The armrest lock serves to lock an armrest, which includes an armrest body 400, an opening door 500 which is provided on the armrest body 400, and a sliding cover 600 which is slidably provided on the opening door 500. The armrest lock includes a lever 100 which is coupled to one side of the sliding cover 600, a rod 200 which is provided in the sliding cover 600 such that one side thereof is coupled to the lever 100, a trigger 210 which is coupled to the other side of the rod 200 and is configured to operate in response to a motion of the lever 100, and a locking element 300 which is coupled to the opening door 500 and the armrest body 400 and is configured to be unlocked from at least one of the opening door 500 and the armrest body 400 in response to a motion of the trigger 210.

Specifically, the armrest body 400 may be a console box which is provided between the driver's seat and the passenger's seat and has a storage space therein, or otherwise a body part of a rear armrest on a rear passenger-side seat which has a storage space therein.

The opening door 500 is a cover in which one side extends towards the front side of a vehicle and the other side is hinge-coupled so that one side is swiveled up and down about the hinge-coupled point, thereby opening and shutting the storage space in the armrest body 400.

As shown in FIG. 2, the opening door 500 is provided, on the upper portion thereof, particularly, between the opening door 500 and the sliding cover 600, with a pair of guide rails 510 which are fixed to the opening door 500. In addition, the sliding cover 600 is provided, on the lower portion thereof, with projections 610 which are coupled to the guide rails 510 so that the sliding cover 600 can slide along the guide rails.

The guide rails 510 may be provided in the longitudinal direction of a vehicle so that the sliding cover 600 can slide forward in the vehicle. However, the guide rails may have other configurations.

Further, the upper portion of the sliding cover 600 may be covered with a support serving as an armrest.

In the meantime, one side of the locking element 300 may be rotatably coupled to the opening door 500 and the other side of the locking element 300 may be engaged with the armrest body 400.

Thus, the other side of the locking element 300 may be provided with an engaging protrusion 330 which extends towards the armrest body 400, and the armrest body 400 may be provided with an engaging groove to be engaged with the engaging protrusion 330.

Further, as shown in FIGS. 2 and 3, one side of the locking element 300 may branch into a V-type or U-type shape, so that the entire locking element 300 can have a Y-shape. A pair of branched parts formed at one side of the locking element may be hinge-coupled to the opening door 500 so that they can rotate about the hinge-coupled point where an elastic member 350, e.g. a torsion spring, is provided so that, in a normal state, the locking element 300 is kept engaged with the armrest body 400, and upon the movement of the rod 200, the locking element is disengaged from the armrest body, thereby opening the storage space in the armrest body 400. The elastic member 350 may also be provided on the lever 100.

Thus, one side of the opening door 500 may be provided with a mounting groove 530 which has a shape corresponding to the locking element 300 so that the locking element 300 is placed there and is coupled to the opening door 500.

Since one side of the locking element 300 branches so that the rod 200 can be positioned between the branched parts, it is easy to utilize a mounting space. Further, since the branched parts each are coupled with the opening door 500, the locking element 300 can be stably supported.

The shape of the locking element 300 may be a variety of other shapes, in addition to the Y-shape, so long as they can function as the locking element 300.

The trigger 210 is configured such that one side is coupled to the rod 200 and the other side is bent towards the locking element 300.

The trigger 210 may be integrally coupled with the rod 200 by means of, but not limited thereto, injection molding or other coupling methods such as bolting, welding or the like. Alternatively, a variety of other coupling methods can be used by skilled persons in the art.

The bent end of the trigger 210 comes into contact with the locking element 300 while the rod 200 moves, pushing the locking element 300. This releases the engagement between the engaging protrusion 330 and the engaging groove 410.

The bent end of the trigger 210 may contact the locking element 300 at a portion which is farthest away from the side of the locking element 300 where the locking element is coupled with the opening door 500.

In the meantime, as previously described herein, the rod 200 may pass between the branched parts formed at one side of the locking element 300, and the trigger 210 may pass through and be provided at the other side of the rod 200.

The opening door 500 may be provided, on an upper portion thereof, with a pair of rod rails 550 along the movement direction of the rod; and the other side of the rod 200 may be provided with a pair of rod-side projections 205 to be coupled to the pair of rod rails 550. When the lever 100 is actuated, the rod-side projections 205 allow the rod 200 to be moved independently from the sliding cover 600, while supporting the other side of the rod 200.

One side of the lever 100 may be rotatably hinge-coupled to one side of the sliding cover 600, and the other side of the lever may be provided with a grip 130. The rod 200 is preferably hinge-coupled to the other side of the lever 100.

According to the above-mentioned construction, when the occupant rotates the lever 100 forwards with sliding cover 600 slid in the forward direction of a vehicle, the rod 200 moves forwards together with the trigger 210, allowing the locking element 300 to be rotated, so that, even when the sliding cover 600 has slid forward, the opening door 500 can be unlocked.

As shown in FIG. 4, one side of the locking element 300 may be provided with a protrusion 310, and one side of the lever 100 may be provided with an extension 110 to be brought into contact with the protrusion 310 of the locking element when the lever 100 rotates.

When the sliding cover 600 slides forwards and returns to its original position, the trigger 210 becomes separated from the locking element 300, making it impossible to perform the unlocking action. Thus, the extension 110 of the lever 100 and the protrusion 310 of the locking element are provided in order to perform the unlocking action even when the sliding cover 600 returns to its original position.

When the lever 100 rotates, the extension 110 of the lever rotates and comes into contact with the protrusion 310 of the locking element, which in turn rotates with the rotation of the extension 110 of the lever, performing the unlocking action.

Although various embodiments illustrate the case in which the lever 100 rotates forwards and the rod 200 moves forward, unlike previously described embodiments, the lever 100 may rotate in other directions such as towards the rear or in a lateral direction, the rotation direction among the lever 100, the rod 200, and the trigger 210 may change, and the unlocking direction of the locking element 300 may also change.

According to the armrest lock having the above-mentioned construction, regardless of whether the armrest cover does or does not slide forwards, the occupant can actuate the lever to open the receptacle in the armrest body, thereby increasing the occupant's convenience.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An armrest lock, in which an armrest includes an armrest body, an opening door provided on the armrest body, and a sliding cover, the armrest lock comprising:

a lever coupled to one side of the sliding cover;
    a rod mounted to the sliding cover, wherein the sliding cover is slidably provided on the opening door and configured to slide between an extended position and a retracted position relative to the opening door, and one side of the rod is coupled to the lever;
    a trigger coupled to the other side of the rod and configured to operate in response to a motion of the lever; and
    a locking element coupled to the opening door and configured to engage the armrest body so as to selectively lock the opening door to the armrest body and configured to be selectively engaged by the trigger, wherein when the sliding cover is in the extended position the locking element is configured to be unlocked from the armrest body when coming into contact with the trigger,
    wherein the opening door is provided, on an upper portion thereof, with a pair of rod rails along a movement direction of the rod, and the other side of the rod is provided with a pair of rod-side projections to be coupled with the pair of rod rails, and
    wherein the locking element is provided, on one side thereof, with a protrusion; and
    wherein one side of the lever is rotatably coupled to the sliding cover and is provided with an extension, wherein when the sliding cover is in the retracted position the extension can be brought into contact with the protrusion of the locking element when the lever rotates to unlock the opening door from the armrest body.

2. The armrest lock according to claim 1, wherein one side of the locking element is rotatably coupled to the opening door and another side of the locking element is configured to be releasable engaged with the armrest body.

3. The armrest lock according to claim 2, wherein the locking element is formed into a pair of branched parts at the one side of the locking element.

4. The armrest lock according to claim 3, wherein the rod passes between the pair of branched parts of the locking element.

5. The armrest lock according to claim 1, wherein one side of the trigger is coupled to the rod and another side is bent towards the locking element.

* * * * *